United States Patent Office 3,737,427
Patented June 5, 1973

3,737,427
NOVEL PROCESS FOR THE PREPARATION OF α-ALKYL-19-NOR-STEROIDS
Albertus Joannes van den Broek, Oss, Netherlands, assignor to Akzona Incorporated, Asheville, N.C.
No Drawing. Filed Mar. 15, 1971, Ser. No. 124,524
Claims priority, application Netherlands, Mar. 24, 1970, 7004241
Int. Cl. C07c 173/00
U.S. Cl. 260—397.3      2 Claims

ABSTRACT OF THE DISCLOSURE

The present invention relates to a novel method for the preparation of a $\Delta^4$-3-keto-6α-alkyl-19-nor-steroid comprising hydrolysing a 3-enolacylate of the corresponding 6β-alkylisomer under alkaline conditions.

---

The invention relates to a novel process for the manufacture of $\Delta^4$-3-keto-6α-alkyl-19-nor-steroids.

There are numerous $\Delta^4$-3-keto-19-nor-steroids on record which are substituted in the 6-position by an alkyl group, chiefly in the 19-nor-androstane and 19-nor-pregnane series. The 6α-isomers thereof generally possess a markedly stronger biological activity than the 6β-isomers.

A conventional method for the preparation of $\Delta^4$-3-keto-6-alkyl-steroids, both in the 19-nor and in the normal 10-methyl series, consists in that a $\Delta^5$-3-acyloxy-steroid is oxidised by means of a per-acid to a 5α,6α-oxido compound, which latter compound is reacted with an alkyl magnesium halide to obtain a 3,5α - dihydroxy-6β-alkyl compound, which is oxidised to the 3-keto compound, which latter compound is finally dehydrated with an acid to obtain the $\Delta^4$-3-keto-6-alkyl compound.

As regards the latter reaction step it has now been found that there is an essential difference between 19-nor-steroids and 10-methyl-steroids. In the latter series only the $\Delta^4$-3-keto 6α-alkyl-isomer is formed on application of a sufficiently strong acid, while a $\Delta^4$-3-keto-6β-alkyl-isomer obtained in milder conditions isomerises completely to the 6α-alkyl compound under the influence of a strong acid. In the 19-nor series on the other hand a mixture of the 6α- and 6β-alkyl-isomers is obtained in the dehydration under strongly acid conditions, the former in about 70% yield only in the most favourable case. If the 6β-isomer were separated from this mixture (assuming that this is practicable) and treated again with an acid, e.g. with a methanolic hydrochloric acid solution, another mixture would be obtained containing in the most favourable case about 70% of the 6α-alkyl compound, whereas in the normal series there occurs a complete, or virtually complete isomerisation in the 6α-alkyl compound. For the preparation of a pure $\Delta^4$-3-keto-6α-alkyl-steroid in the 19-nor series one will consequently either have to put up with a considerably lower yield than in the normal series or the separation described above of the two components and isomerisation of the 6β-alkyl compound will have to be repeated a great many times, but even then a complete isomerisation to the 6α-alkyl compound will of course never be reached.

Surprisingly it has now been found that a $\Delta^4$-3-keto-6α-alkyl-19-nor-steroid can be obtained quantitatively from a 6β-alkyl-19-nor-steroid in a simple manner by hydrolysing a 3-enol-acylate of a $\Delta^4$-3-keto-6β-alkyl-19-nor-steroid under alkaline conditions.

Compared with the result obtained by an acid hydrolysis, which only yields a mixture of the 6α- and 6β-isomers in the known ratio of about 7:3, this result is even more surprising. Analogous mixtures are obtained by hydrolysing 3-enolethers or 3-enamines of $\Delta^4$-3-keto-6β-alkyl-19-nor-steroids.

The 3 - enol - acylate of a $\Delta^4$-3-keto-6β-alkyl-19-nor-steroid to be used as starting product in the process according to the invention, can be prepared in various manners.

A conventional manner consists in that a $\Delta^4$-3-keto-6β-alkyl-19-nor-steroid is converted in a conventional manner into the corresponding 3-enol-acylate. In practice a mixture of the 6α-and 6β-alkyl-isomers will usually be taken as starting material.

Another method consists in that the starting material is a 3-keto-5α-hydroxy-6β-alkyl-19-nor-steroid, which compound also dehydrates in the reaction conditions of the 3-enol-acylation, to obtain the $\Delta^{3,5}$-3-acyloxy-6-alkyl-19-nor-steroid.

The 3-enol-acylation of the $\Delta^4$-3-keto-6β-alkyl-19-nor-steroid can be performed by any method known per se, e.g. by reacting said steroid with a carboxylic acid anhydried and an acid catalyst such as para-toluene sulphonic acid or dinitrobenzene sulphonic acid, or by reacting it with an acylchloride and a carboxylic acid anhydride in the presence of a base such as pyridine.

The acyl group to be introduced in the 3-position need not be limited in principle so that it can be derived from any aliphatic, aromatic, araliphatic or heterocyclic carboxylic acid, but in practice it is of course preferred to use a lower aliphatic carboxylic acid, e.g. acetic acid.

The alkaline hydrolysis also takes place by any method known per se, e.g. by leaving the 3-enol-acylate for some time at room temperature in a solution of an alkaline metal hydroxide or alkaline earth metal hydroxide in an organic liquid, which may contain water.

The hydrolysis is usually complete after some 5 to 45 minutes i.e. dependent upon the reaction conditions such as temperature and pH. As soon as the hydrolysis is complete the reaction should be stopped, otherwise isomerisation can occur again.

The 3 - enol - acylates of $\Delta^4$-3-keto-6β-alkyl-19-nor-steroids to be used as starting products, are not confined to certain series or configurations, but on account of their biological activity the 3-enol-acylates occurring in the 19-nor-androstane and 19-nor-pregnane series are the most important.

The invention is further illustrated by the following examples:

EXAMPLE I

A mixture of 6 gm. of $\Delta^4$-3,17-diketo-6β-methyl-oestrene 65 ml. of acetic anhydride, 2.2 ml. of pyridine and 21 of acetylchloride are boiled for 3 hours. Then the reaction mixture is poured into ice-water and the precipitate filtered off to obtain 5.7 gm. of 3-hydroxy-6-methyl-$\Delta^{3,5}$-oestradiene - 17-on-3-acetate. The crude enol-acetate is suspended in 150 ml. of methanol and hydrolysed for 15 minutes with 25 ml. of a 10% sodium hydroxide solution at 0–6° C. and in nitrogen atmosphere. Then the reaction mixture is poured into water and the precipitate filtered off and washed with water to obtain 5.4 gm. of 6α-methyl-$\Delta^4$-oestrene-3,17-dion (M.P. 147–149° C.) containing less than 2% 6β-methylisomer according to the NMR-spectre and gas-chromatographic analysis. The crude product is crystallised from acetone-ether to obtain 4.8 gm. of pure 6α-methyl-$\Delta^4$-oestrene-3,17-dion (M.P. 154–155° C. and [α]$_D$ +95° (CHCl$_3$)).

For comparison with the process according to the invention another two experiments were performed by means of known methods, which should also lead to the pure $\Delta^4$-3,7-diketo-6α-methyl-oestrene if the conversion in the 19-nor series would proceed in the same manner as in the normal series.

(A) Ten grams of 5α-hydroxy-6β-methyl-oestrene-3,17-dion were boiled for 1 hour in 100 ml. of methanol and 1.5 ml. of 36% hydrochloric acid. The reaction mixture was poured into water and the precipitate filtered off, washed with water and dried in vacuo at 50° C. The crude product melted at 131–133° C. and contained according to the NMR-spectre and gas-chromatographic analysis about 70% 6α- and 30% 6β-methyl-Δ$^4$-oestrene-3,17-dien. After crystallisation from an acetone-ether mixture 8.5 gm. of product were obtained (M.P. 138–140° C. and content about 25% 6β-methyl-isomer).

(B) Ten grams of the crude mixture of 6α- and 6β-methyl-Δ$^4$-oestrene-3,17-dion, obtained by the process described under (A) were suspended in 10 ml. of ethanol and 8.4 ml. of ethylorthoformiate. To this suspension was added 0.06 gm. of para-toluene sulphonic acid. The reaction mixture was stirred for 1½ hours at 0° C. The reaction was stopped by adding 0.4 ml. of pyridine. The mixture was cooled to −15° C., after which the crystals were filtered off, washed with cold ethanol and dried in vacuo at 40° C. to obtain 9 gm. of 3-enolether. The enolether was added to 360 ml. of methanol and 36 ml. of 10% HCl. The mixture was stirred at 0–5°C. for 3 hours. The crude product obtained melted at 130–134° C. and according to the NMR-spectre and gas-chromatographic analysis it contained about 70% 6α- and 30% 6β-methyl-Δ$^4$-oestrene-3,17-dion.

EXAMPLE II

Five grams of the crude mixture of 6α- and 6β-methyl-Δ$^4$-oestrene-3,17-dion, obtained in the manner described in Example I(A) were boiled for 5 hours in 50 ml. of propionic acid anhydride, 2 ml. of pyridine and 80 ml. of propionic acid chloride. The 3-enolpropionate was hydrolysed in the same manner as in Example I to obtain 3.9 gm. of pure 6α-methyl-Δ$^4$-oestrene-3,17-dion.

EXAMPLE III

Thirty-seven grams of 6-methyl-3-hydroxy-Δ$^{3,5}$-pregnadiene-20-on-3-acetate in 770 ml. of methanol and 230 ml. of tetrahydrofuran were hydrolysed for 5 minutes with 54 ml. of 2.2 N sodium ethanolate in methanol, in nitrogen atmosphere. Then the reaction mixture was diluted with 400 ml. of methanol acidified with 142 ml. of 2 N H$_2$SO$_4$ and further diluted with water. The precipitate was filtered off, washed with water and dried in vacuo. By crystallisation from a mixture of methylene chloride-ether-petroleum-ether 26 gm. of 6α-methyl-Δ$^4$-19-nor-pregnene-3,20-dion were obtained from it (M.P. 116–118° C. and [α]$_D$ +95° (CHCl$_3$)). According to the NMR-spectre and gas-chromatographic analysis pure 6α-methyl-isomer.

The same result was obtained starting from the 3-enol-butyrate and the 3-enol caproate of Δ$^4$-3,20-diketo-6β-methyl-pregnene.

EXAMPLE IV

Thirty-one grams of 5α-hydroxy-6β-ethyl-oestrane-3,17-dion were boiled for 3 hours in 290 ml. of acetic anhydride, 10 ml. of pyridine and 95 ml. of acetyl chloride. Then the reaction mixture was poured into ice-water and the precipitate filtered, washed with water and evaporated to dryness in vacuo at 40° C. The crude enolacetate was hydrolysed for 15 minutes in 660 ml. of methanol and 66 ml. of 10% sodium hydroxide at 0–5° C. and in nitrogen atmosphere. Then the reaction mixture was poured into water in which acetic acid was dissolved. The precipitate was filtered, washed with water, dried and crystallised from ether-pentane to obtain 23 gm. of pure 6α-ethyl-Δ$^4$-oestrene-3,17-dion (M.P. 93–94° C. and [α]$_D$ +58°; CHCl$_3$)).

EXAMPLE V

To 2 gm. of 6-methyl-Δ$^{3,5}$-oestradiene-3,17β-diol-3,17β-diacetate were added 80 ml. of methanol and 4 ml. of 10% NaOH. The mixture was stirred for 10 minutes in nitrogen atmosphere at 0–5° C. The reaction mixture was poured into water and after having been processed, crystallised from methanol-water to obtain 1.5 gm. of pure 6α-methyl - 17β - hydroxy - Δ$^4$ - oestrene-3-on-17β-acetate.

In an analogous manner the 3,17β-di-propionate, the 3,17β- di-benzoate and the 3β,17β-di-phenylpropionate of the above compound have been hydrolysed to the corresponding Δ$^4$-3-keto-6α-methyl-steroid.

What is claimed is:

1. Process for the manufacture of a Δ$^4$-3-keto-6α-alkyl-19-nor-steroid which comprises hydrolyzing a 3-enol-acylate of a Δ$^4$-3-keto-6β-alkyl-19-nor-steroid with an alkali metal hydroxide to produce isomerization at the 6-position to the Δ$^4$-3-keto-6α-alkyl-19-nor-steroid.

2. The process of claim 1 in which said hydrolysis is performed by contacting the 3-enol-acylate with a solution of the alkali metal hydroxide in water and an organic solvent.

References Cited

UNITED STATES PATENTS

| | | | |
|---|---|---|---|
| 3,465,009 | 9/1969 | Teller et al. | 260—397.4 |
| 3,449,495 | 6/1969 | Bruckner et al. | 429—243 |

ELBERT L. ROBERTS, Primary Examiner

U.S. Cl. X.R.

260—397.5